(12) United States Patent
Bock et al.

(10) Patent No.: US 8,463,410 B2
(45) Date of Patent: Jun. 11, 2013

(54) METHOD FOR MOVING A MACHINE ELEMENT OF AN AUTOMATION MACHINE AND A CONTROL DEVICE

(75) Inventors: Marco Bock, Magdeburg (DE); Wolfgang Papiernik, Neunkirchen (DE); Tomas Sauer, Feucht (DE)

(73) Assignee: Siemens Aktiengesellschaft, München (DE)

( * ) Notice: Subject to any disclaimer, the term of this patent is extended or adjusted under 35 U.S.C. 154(b) by 63 days.

(21) Appl. No.: 13/024,673

(22) Filed: Feb. 10, 2011

(65) Prior Publication Data

US 2012/0150325 A1  Jun. 14, 2012

(30) Foreign Application Priority Data

Feb. 10, 2010 (DE) .......................... 10 2010 001 781

(51) Int. Cl.
*G05B 11/32* (2006.01)
(52) U.S. Cl.
USPC ............. 700/47; 700/173; 700/174; 700/159; 700/172
(58) Field of Classification Search
USPC ......................................................... 318/575
See application file for complete search history.

(56) References Cited

U.S. PATENT DOCUMENTS

| | | | |
|---|---|---|---|
| 4,742,444 A * | 5/1988 | Gose et al. ...................... 700/37 |
| 5,109,148 A * | 4/1992 | Fujita et al. ............... 219/121.82 |
| 5,262,707 A * | 11/1993 | Okazaki et al. ............... 318/592 |
| 5,751,585 A | 5/1998 | Cutler |
| 5,798,927 A | 8/1998 | Cutler |
| 5,801,939 A * | 9/1998 | Okazaki ........................... 700/56 |
| 5,949,685 A * | 9/1999 | Greenwood et al. ........... 700/193 |
| 6,980,881 B2 * | 12/2005 | Greenwood et al. ........... 700/193 |
| 6,982,536 B2 * | 1/2006 | Geissdorfer et al. .......... 318/632 |
| 7,299,108 B2 * | 11/2007 | Geissdorfer et al. .......... 700/188 |
| 7,319,910 B2 * | 1/2008 | Papiernik ......................... 700/63 |
| 7,482,776 B2 * | 1/2009 | Scholich-Tessmann ...... 318/575 |
| 7,710,060 B2 * | 5/2010 | Cardinale et al. ........... 318/568.1 |
| 7,869,898 B2 * | 1/2011 | Scholich-Tessmann ...... 700/192 |

(Continued)

FOREIGN PATENT DOCUMENTS

CN 101116043 A 1/2008
CN 101556472 A 10/2009

(Continued)

OTHER PUBLICATIONS

S. Staroselsky, K.A. Stelson: Two-Stage Actuation for Improved Accuracy of Contouring; Productivity Center, Departm. of Mechanical Engineering, Univ. of Minnesota, Minneapolis, MN 55455; WA4—12:15; pp. 127-132; Others; 1988.

*Primary Examiner* — Kavita Padmanabhan
*Assistant Examiner* — Christopher E Everett
(74) *Attorney, Agent, or Firm* — Henry M Feiereisen LLC (57) ABSTRACT

The invention relates to a method and a control device for moving a machine element of an automation machine by dividing an overall movement of the machine element into separately controlled first and a second movement sections extending in a common direction. Desired values for the first and second movement sections are monitored for compliance with a predefined movement constraint. If the first and/or second desired values fail to comply with the predefined movement constraint, the first movement component and/or the second movement component are changed in an iterative process until the changed first and/or second desired values are in compliance with the predefined movement constraint. The changed first and/or second desired values are stored as new first and/or second desired values for moving the machine element. The method and control device prevent overloading of the drive shafts of an automation machine having redundant kinematics.

7 Claims, 4 Drawing Sheets

U.S. PATENT DOCUMENTS

| | | | |
|---|---|---|---|
| 8,000,828 B2 * | 8/2011 | Liang | 700/117 |
| 2001/0044662 A1 * | 11/2001 | Nakane | 700/28 |
| 2004/0183494 A1 * | 9/2004 | Nagaoka et al. | 318/632 |
| 2006/0186845 A1 * | 8/2006 | Terada et al. | 318/432 |
| 2009/0295323 A1 * | 12/2009 | Papiernik et al. | 318/571 |
| 2010/0268371 A1 * | 10/2010 | Kasuya | 700/114 |

FOREIGN PATENT DOCUMENTS

| | | |
|---|---|---|
| DE | 10065422 A1 | 7/2002 |
| DE | 10355614 A1 | 7/2005 |
| DE | 102005061570 A1 | 7/2007 |
| EP | 1688807 A1 | 8/2006 |

* cited by examiner

METHOD FOR MOVING A MACHINE ELEMENT OF AN AUTOMATION MACHINE AND A CONTROL DEVICE

CROSS-REFERENCES TO RELATED APPLICATIONS

This application claims the priority of German Patent Application, Serial No. 10 2010 001 781.7 filed Feb. 10, 2010, pursuant to 35 U.S.C. 119(a)-(d), the content of which is incorporated herein by reference in its entirety as if fully set forth herein.

BACKGROUND OF THE INVENTION

The present invention relates to a method for moving a machine element of an automation machine. The invention also relates to a control device for controlling a movement of a machine element of an automation machine.

The following discussion of related art is provided to assist the reader in understanding the advantages of the invention, and is not to be construed as an admission that this related art is prior art to this invention.

Machine tools, in particular, are often provided with so-called redundant kinematics. In this case, redundant kinematics are understood as meaning the possibility of moving a machine element, which may be in the form of a tool receiving apparatus or a tool which is clamped in the tool receiving apparatus for example, along a direction with the aid of two separate drive shafts.

Figure 1:
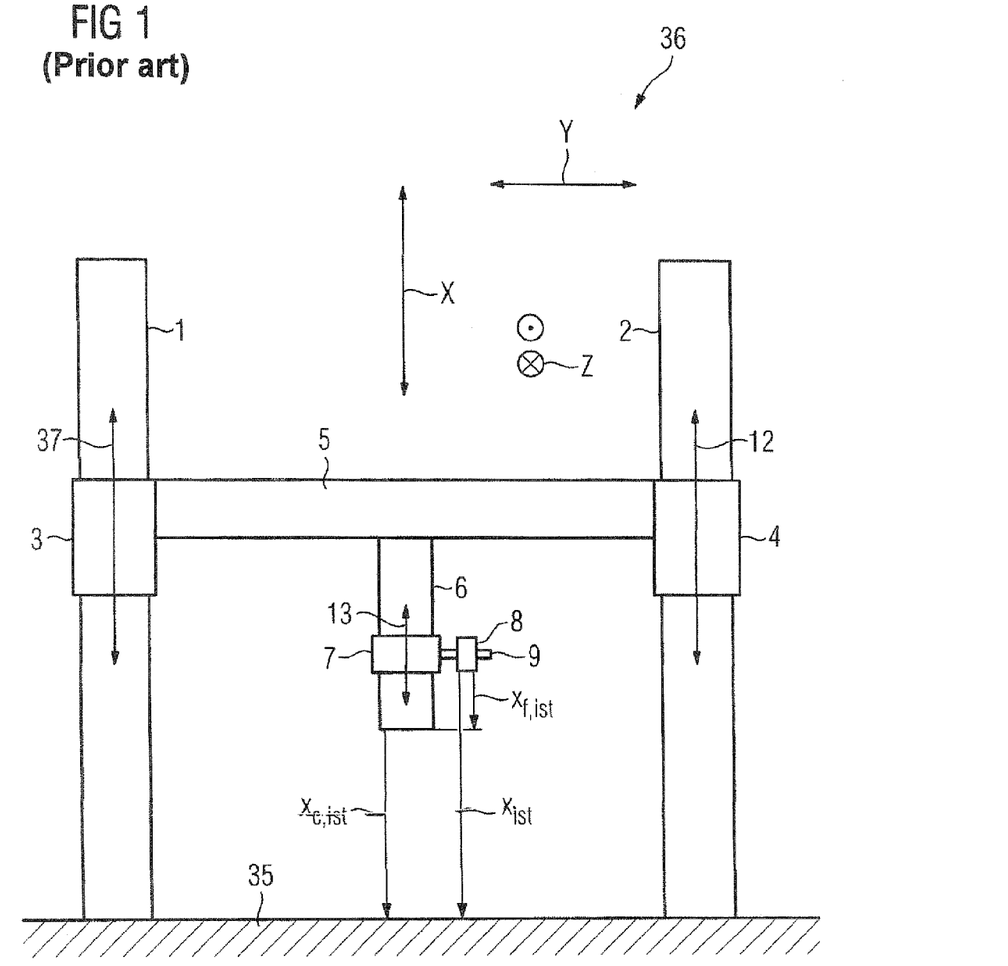
FIG. 1 shows a schematically illustrated machine tool which is known from the prior art.

FIG. 1 uses a schematically illustrated machine tool 36 to illustrate the principle of redundant kinematics. A carrier 5 can be moved in a direction X with the aid of two linear motors 3 and 4. The guidance of the movement in the X direction is ensured by two columns 1 and 2 in this case. A further column 6 which is used to guide the movement of a second linear motor 7 is fastened to the carrier 5. The linear motor 7 likewise moves in the X direction. The direction of movement of the linear motors 3, 4 and 7 is indicated by depicted arrows 37, 12 and 13. A machine element 8 which is in the form of a tool receiving apparatus within the scope of the exemplary embodiment is fitted to the linear motor 7. A tool 9 is clamped in the tool receiving apparatus.

It goes without saying that the machine tool 36 also has further motors which allow a movement of the machine element 8, for example in the Y and Z directions, but are not illustrated in FIG. 1 for the sake of clarity and since they are irrelevant to understanding the invention.

In order to measure first actual values $x_{c,ist}$ which indicate the position of the column 6 with respect to a stationary machine bed 35 of the machine, the machine 36 has a first measuring device which is not illustrated in FIG. 1 for the sake of clarity. In order to measure second actual values $x_{f,ist}$ which indicate the position of the machine element 8 with respect to the column 6, the machine tool 36 has a second measuring device which is likewise not illustrated in FIG. 1 for the sake of clarity.

If the machine element 8 is intended to be moved to a particular desired position value in the direction X, the problem arises of how the movement required for this purpose is intended to be divided between the two linear motors 3 and 4 and the linear motor 7. Since the linear motor 7 must move only small masses (machine element 8 and tool 9), it is able to carry out dynamic movements (for example movements with high accelerations) in the X direction, whereas the two linear motors 3 and 4 can carry out only relatively sluggish movements on account of the larger masses to be moved by them.

It is therefore expedient to divide the movement of the machine element into a first movement component, which is carried out by the two linear motors 3 and 4, and a second movement component which is carried out by the linear motor 7. In this case, the first movement component comprises the movement processes which are not very dynamic, that is to say the low-frequency movement processes, whereas the second movement component comprises the dynamic, that is to say high-frequency, movement processes of the machine element.

Figure 2:
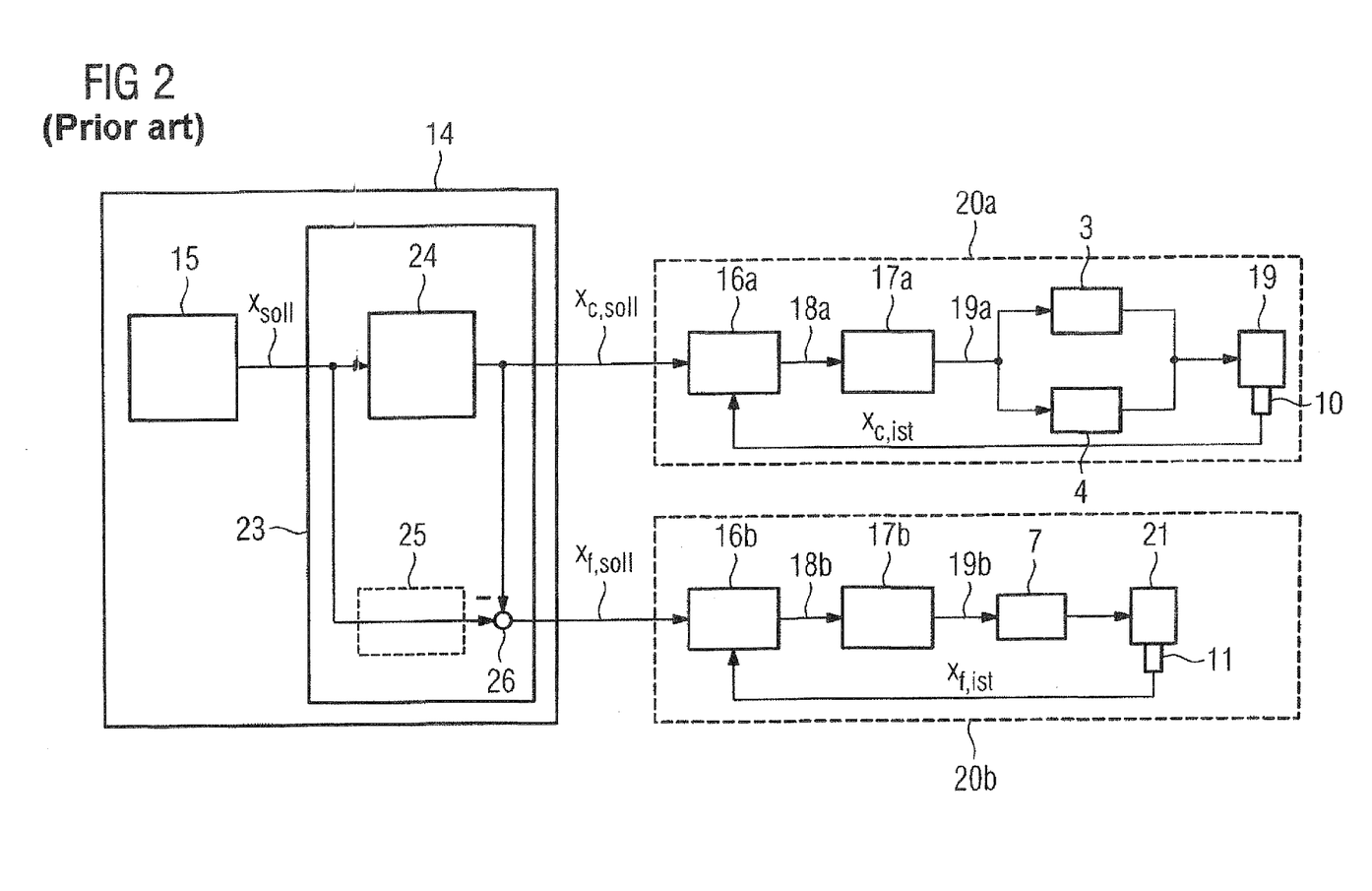
FIG. 2 shows a block diagram of a control device which is known from the prior art.

FIG. 2 illustrates a commercially available control device 14 which is used to divide a movement of a machine element of an automation machine. The control device 14 has a desired value generating unit 15 which generates desired movement values $x_{soll}$ for the movement of the machine element 8. In this case, the desired movement values $x_{soll}$ are usually in the form of desired position values. In this case, the individual desired movement values $x_{soll}$ are spaced apart equidistantly from one another in terms of time. For example, the desired value generating unit 15 can generate a desired movement value $x_{soll}$ every millisecond. In this case, the desired value generating unit 15 generates the desired movement values using a predefined parts program which predefines the movements to be carried out by the machine element 8 in the form of instructions. It is noted at this point that the desired value generating unit 15 accordingly generates desired movement values for each of the directions X, Y and Z, FIG. 2 and the subsequent figures illustrating only the desired movement values $x_{soll}$, which predefine the movement in the X direction, and the associated drive shafts 20a and 20b which are used to carry out the movement in the X direction. The first actual values $x_{c,ist}$ indicate the first movement component of the machine element 8 by indicating the position of the column 6 with respect to the machine bed 35 within the scope of the exemplary embodiment according to FIG. 1. The second actual values $x_{f,ist}$ indicate the second movement component of the machine element 8 by indicating the position of the machine element 8 with respect to the column 6 within the scope of the exemplary embodiment according to FIG. 1.

The desired movement values $x_{soll}$ are then supplied to a movement dividing unit 23 which is known from the prior art and uses the desired movement values $x_{soll}$ to determine first desired values $x_{c,soll}$ for controlling the first movement component and second desired values $x_{f,soll}$ for controlling the second movement component and outputs said first and second desired values. In this case, the first movement component is carried out using the first drive shaft 20a and the second movement component is carried out using the drive shaft 20b. In this case, the first desired values $s_{c,soll}$ are the regulating desired values for regulating the first movement component and the second desired values $x_{f,soll}$ are the regulating desired values for regulating the second movement component of the movement of the machine element 8.

The movement dividing method carried out by the movement dividing unit 23 has been disclosed, for example, in U.S. Pat. No. 6,982,536 B2, which is incorporated herein by reference in its entirety. The movement of the machine element is divided into movement sections and the desired value generating unit accordingly outputs desired movement values $x_{soll}$ for each movement section in succession. In order to divide the movement, the desired movement values $x_{soll}$ are filtered using a low-pass filter 24 and the first desired values $x_{c,soll}$ are generated on the output side in this manner. In order to determine the second desired values $x_{f,soll}$, the first desired values $x_{c,soll}$ are subtracted from the desired movement values $x_{soll}$ using a subtractor 26 and the second desired values $x_{f,soll}$ for regulating the second drive shaft 20*b* are generated in this manner. As already stated, this method is prior art. In order to compensate for the temporal delay in the first desired values $x_{c,soll}$ which is caused by the filter 24, U.S. Pat. No. 6,982,536 B2 also discloses the practice of additionally providing a delay unit 25 if necessary in order to likewise temporally delay the desired movement values $x_{soll}$ in a corresponding manner for adaptation to the delay in the first desired values $x_{c,soll}$. The delay unit 25 is illustrated using dashed lines in FIG. 2.

In order to regulate the first movement component of the machine element 8, the first desired values $x_{c,soll}$ are supplied, as regulating desired values for regulating the first movement component of the machine element 8, to a first regulating means 16*a*. The first regulating means 16*a* drives a first power converter 17*a*, which is illustrated by an arrow 18*a* in FIG. 2, in accordance with the first desired values $x_{c,soll}$ and the first actual values $x_{f,ist}$ which are measured using a first measuring device 10 and indicate the position of the machine element 8 with respect to the machine bed 35 within the scope of the exemplary embodiment according to FIG. 1. The first power converter 17*a* accordingly drives the two linear motors 3 and 4, which is illustrated by an arrow 19*a*, the linear motors 3 and 4 moving a load 19. In this case, the load 19 comprises all elements which are moved by the linear motors 3 and 4 in the direction X. The first regulating means 16*a*, the first power converter 17*a*, the linear motors 3 and 4, the load 19 and the measuring device 10 form a first drive shaft 20*a* which is used to carry out the first movement component of the machine element 8. The first actual variable $x_{c,ist}$ indicates the first movement component of the machine element 8 by indicating the position of the column 6 with respect to the machine bed 35 within the scope of the exemplary embodiment according to FIG. 1.

In order to regulate the second movement component of the machine element 8, the second desired values $x_{f,soll}$ are supplied, as regulating desired values for regulating the second movement component of the machine element 8, to a second regulating means 16*b*. The second actual values $x_{f,ist}$ which are measured using a second measuring device 11 and indicate the position of the machine element 8 with respect to the column 6 within the scope of the exemplary embodiment according to FIG. 1 are also supplied to the second regulating unit 16*b* as regulating actual values. The second actual values $x_{f,ist}$ indicate the second movement component of the machine element 8 by indicating the position of the machine element 8 with respect to the column 6 within the scope of the exemplary embodiment according to FIG. 1.

The second regulating means 16*b* drives a second power converter 17*b*, which is illustrated by an arrow 18*b* in FIG. 2, in accordance with the second desired values $x_{f,soll}$ and the second actual values $x_{f,ist}$. The second power converter 17*b* accordingly drives the linear motor 7, which is illustrated by an arrow 19*b*, the linear motor 7 moving a load 21. In this case, the load 21 comprises all elements which are moved by the linear motor 7 in the direction X. The second regulating means 16*b*, the second power converter 17*b*, the linear motor 7, the load 21 and the measuring device 11 form a second drive shaft 20*b* which is used to carry out the second movement component of the machine element 8.

It is noted at this point that the desired value generating unit 15 likewise generates corresponding desired values for controlling the movement of the drive shafts which are used to move the machine element in the Y and Z directions. These desired values and the drive shafts which are used to move the machine element in the Y and Z directions are not illustrated in FIG. 2 and the subsequent figures for the sake of clarity and since they are irrelevant to understanding the invention.

In this case, the desired value generating unit 15 generates the desired values $x_{soll}$ in such a manner that the desired value generating unit 15 complies with predefined control restrictions to which the movement of the machine element and the movement of the drive shafts involved are subject. The machine element 8 can thus be moved in the X direction only at a maximum speed $V_x$, with a maximum acceleration $A_x$ and with a maximum jerk $J_x$ since, for example, the force produced by the relevant drive shaft for the purpose of accelerating the machine element in the X direction allows only the maximum acceleration $A_x$ in the X direction, for example. The desired movement values $x_{soll}$ for the movement of the machine element in the X direction are therefore always generated by the desired value generating unit 15 in such a manner that:

$$|x'_{soll}| \leq V_x$$

$$|x''_{soll}| \leq A_x$$

$$|x'''_{soll}| \leq J_x$$

where $x'_{soll}$ is the derivative of $x_{soll}$ with respect to time t and $x''_{soll}$ is the second derivative of $x_{soll}$ with respect to time t and $x'''_{soll}$ is the third derivative of $x_{soll}$ with respect to time t.

If there is only one drive shaft for each direction of movement, no problems arise when moving the machine element. If, however, the machine has redundant kinematics, that is to say two drive shafts are available for carrying out the movement in the X direction for example, it is often the case with commercially available machines that the first desired values $x_{c,soll}$ determined by the movement dividing unit 23 and/or the second desired values $x_{f,soll}$ determined by the movement dividing unit 23 exceed the movement restrictions of the first drive shaft 20*a* and/or second drive shaft 20*b*. This results in the machine element 8 not being moved in the manner predefined by the first desired value $x_{c,soll}$ and the second desired value $x_{f,soll}$, which results in machining errors, which may be in the form of contour errors for example, and, in the worst case scenario, may result in the machine being switched off if the corresponding drive shaft is overloaded to an excessive extent.

It would therefore be desirable and advantageous to provide an improved method to obviate prior art shortcomings and to avoid overloading of the drive shafts in an automation machine having redundant kinematics.

SUMMARY OF THE INVENTION

According to one aspect of the present invention, a method for moving a machine element of an automation machine includes the steps of dividing an overall movement of the machine element into movement sections having a first movement component and a second movement component extending in a common direction, generating desired movement values for controlling the overall movement, wherein the desired movement values are composed of first desired values for controlling the first movement component and second desired values for controlling the second movement component, monitoring the first and second desired values for compliance with a predefined movement constraint, generating changed first and/or second desired values, if the first and/or second desired values fail to comply with the predefined movement constraint, for the first movement component and/or the second movement component in an iterative process until the changed first and/or second desired values are in compliance with the predefined movement constraint, and storing the changed first and/or second desired values as new first and/or second desired values for moving the machine element.

According to another aspect of the invention, a control device for controlling an overall movement of a machine element of an automation machine, with the overall movement of the machine element being divided into movement sections having a first movement component and a second movement component extending in a common direction, includes a desired value generating unit which generates, for the movement sections, desired overall movement values controlling the overall movement in the common direction, a movement dividing unit which determines from the generated desired overall movement values first desired values for controlling the first movement component and second desired values for controlling the second movement component, and a monitoring unit which monitors whether the first and second desired values comply with a predefined movement constraint. The control device is configured to generate, if the first and/or second desired values fail to comply with the predefined movement constraint, changed first and/or second desired values for the first movement component and/or the second movement component in an iterative process until the changed first and/or second desired values are in compliance with the predefined movement constraint, and to store the changed first and/or second desired values as new first and/or second desired values for controlling an overall movement of the machine element.

Advantageously the desired movement values may be stored in a second buffer and are read from the second buffer by a movement dividing unit, the movement dividing unit using the desired movement values to determine first desired values for controlling the first movement component and second desired values for controlling the second movement component.

Advantageously, the predefined movement constraint may be one or more parameters selected from the group consisting of $V_c$ (speed of first movement component), $A_c$ (acceleration of first movement component), $J_c$ (jerk of first movement component), $V_f$ (maximum speed of second movement component), $A_f$ (maximum acceleration of second movement component) and $J_f$ (maximum jerk of second movement component).

The automation machine may be embodies as a machine tool; however, the machine may also be in form of other types of automation machines.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
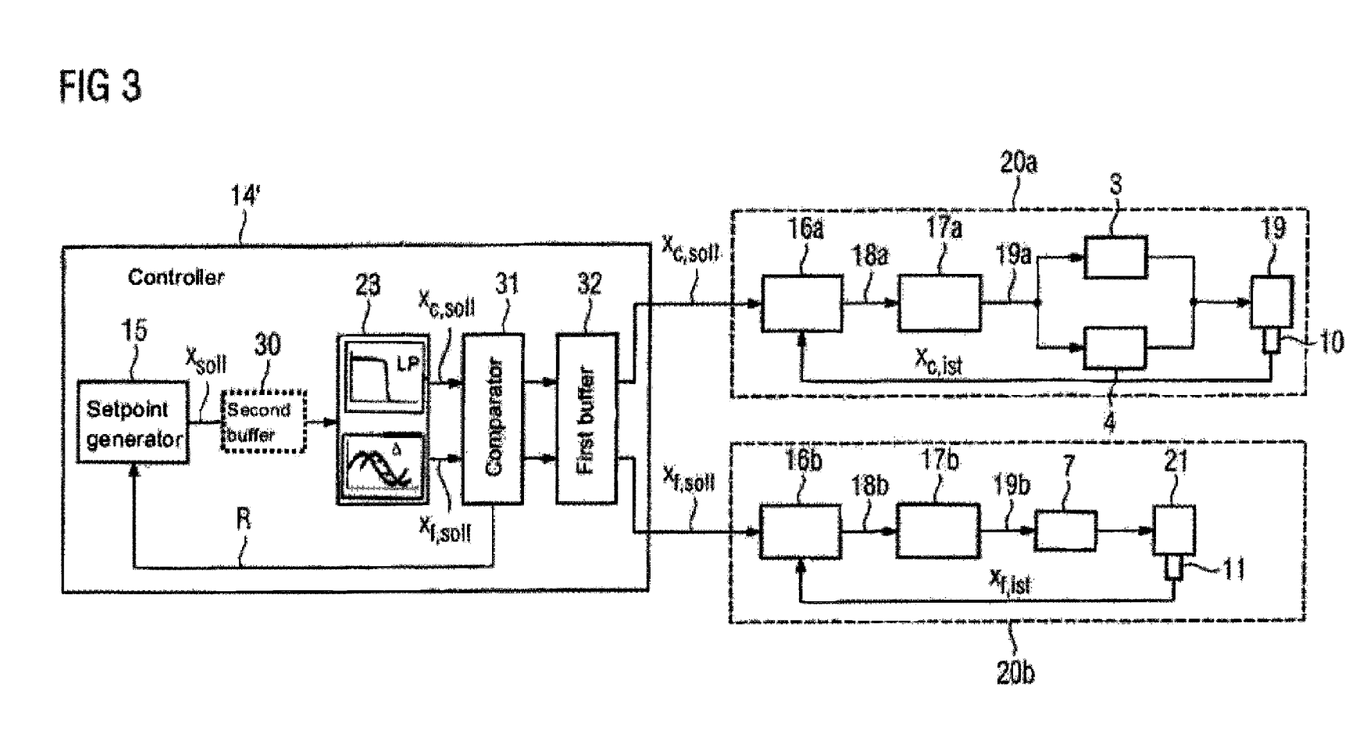
FIG. 3 shows a block diagram of a control device according to the invention.

Turning now to the drawing, and in particular to FIG. 3, there is shown a schematic block diagram of a control device 14' according to the invention. In this case, the control device 14' may be in the form of a CNC controller, for example.

In FIG. 3, the same elements are provided with the same reference symbols as in FIG. 2. In exactly the same way as in the prior art according to FIG. 2, the desired value generating unit (also referred to as setpoint generator) 15' generates desired movement values $x_{soll}$ and transmits them to the movement dividing unit (also referred to as movement apportioning device) 23. Within the scope of the exemplary embodiment, the movement dividing unit 23 according to FIG. 3 corresponds in this case to the movement apportioning device 23 which is known from the prior art according to FIG. 2. In contrast to the control device 14 which is known from the prior art according to FIG. 2, the control device 14' according to the invention additionally has a monitoring unit (also referred to as comparator) 31 and a first buffer 32. The comparator 31 is illustrated again in detail in FIG. 4 in the form of a block diagram. The comparator 31 monitors whether the first desired values $x_{c,soll}$ comply with the movement restrictions predefined for the first drive shaft 20a and whether the second desired values $x_{f,soll}$ comply with the movement restrictions predefined for the second drive shaft 20b. Within the scope of the exemplary embodiment, the movement restrictions for the first drive shaft 20a in this case are in the form of a maximum speed $V_c$ which is possible using the first drive shaft 20a, a maximum acceleration $A_c$ which is possible using the first drive shaft 20a and a maximum jerk $J_c$ which can be achieved using the first drive shaft 20a. Within the scope of the exemplary embodiment, the movement restrictions for the second drive shaft 20b in this case are in the form of a maximum speed $V_f$ which is possible using the second drive shaft 20b, a maximum acceleration $A_f$ which is possible using the second drive shaft 20b and a maximum jerk $J_f$ which can be achieved using the second drive shaft 20b.

Figure 4:
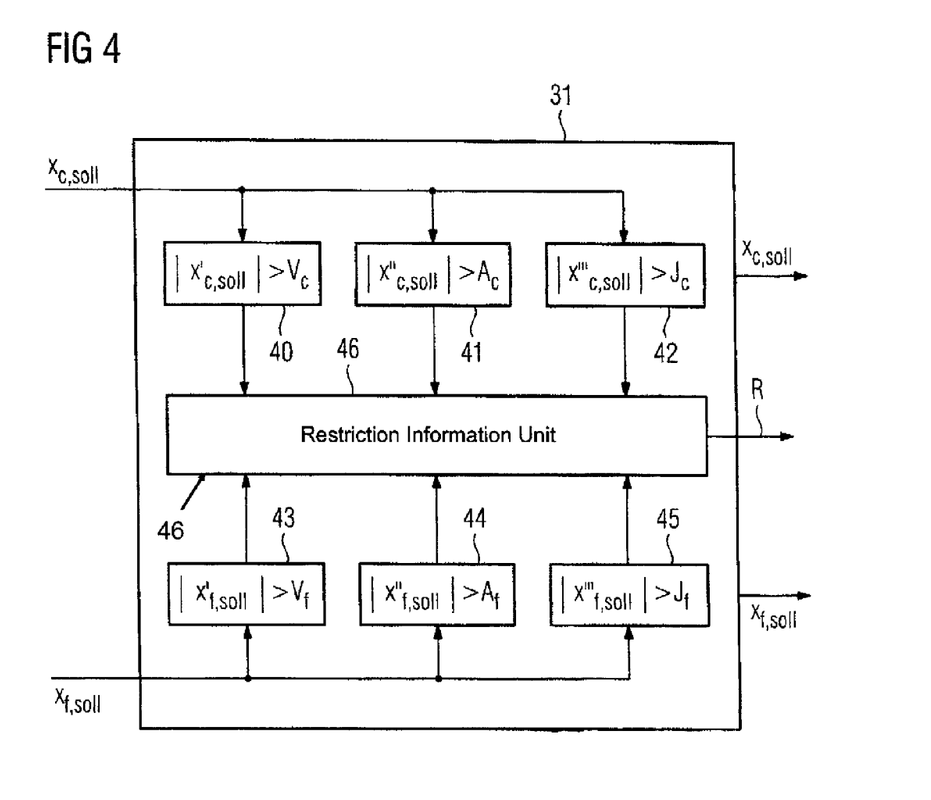
FIG. 4 shows a monitoring unit according to the invention.

For this purpose, the first desired values $x_{c,soll}$ are differentiated with respect to time t in the comparison unit 40 and first desired speed values $x'_{c,soll}$ are calculated in this manner. The magnitude of the first desired speed values $x'_{c,soll}$ is then determined and compared in order to determine whether the magnitude of the first desired speed values $x'_{c,soll}$ exceeds the maximum possible speed $V_c$ which can be achieved by the first drive shaft 20a.

For this purpose, the first desired values $x_{c,soll}$ are also differentiated a second time with respect to time t in the comparison unit 41 and first desired acceleration values $x''_{c,soll}$ are calculated in this manner. The magnitude of the first desired acceleration values $x''_{c,soll}$ is then determined and compared in order to determine whether the magnitude of the first desired acceleration values $x''_{c,soll}$ exceeds the maximum possible acceleration $A_c$ which can be achieved by the first drive shaft 20a.

For this purpose, the first desired values $x_{c,soll}$ are also differentiated a third time with respect to time t in the comparison unit 42 and first desired jerk values $x'''_{c,soll}$ are calculated in this manner. The magnitude of the first desired jerk values $x'''_{c,soll}$ is then determined and compared in order to determine whether the magnitude of the first desired jerk values $x'''_{c,soll}$ exceeds the maximum possible jerk $J_c$ which can be achieved by the first drive shaft 20a.

For this purpose, the second desired values $x_{f,soll}$ are also differentiated with respect to time t in the comparison unit 43 and second desired speed values $x'_{f,soll}$ are calculated in this manner. The magnitude of the second desired speed values $x'_{f,soll}$ is then determined and compared in order to determine whether the magnitude of the second desired speed values $x'_{f,soll}$ exceeds the maximum possible speed $V_f$ which can be achieved by the second drive shaft 20b.

For this purpose, the second desired values $x_{f,soll}$ are also differentiated a second time with respect to time t in the comparison unit 44 and second desired acceleration values $x''_{f,soll}$ are calculated in this manner. The magnitude of the second desired acceleration values $x''_{f,soll}$ is then determined and compared in order to determine whether the magnitude of the second desired acceleration values $X''_{f,soll}$ exceeds the maximum possible acceleration $A_f$ which can be achieved by the second drive shaft 20b.

For this purpose, the second desired values $x_{f,soll}$ are also differentiated a third time with respect to time t in the comparison unit 45 and second desired jerk values $x'''_{f,soll}$ are calculated in this manner. The magnitude of the second desired jerk values $x'''_{f,soll}$ is then determined and compared in order to determine whether the magnitude of the second desired jerk values $x'''_{f,soll}$ exceeds the maximum possible jerk $J_f$ which can be achieved by the second drive shaft 20b.

The comparison units inform a restriction information unit 46 of the result of the comparison with the movement restrictions. If both the movement restrictions $V_c$, $A_c$ and $J_c$ predefined for the first drive shaft 20a and the movement restrictions $V_f$, $A_f$ and $J_f$ predefined for the second drive shaft 20b are complied with for the relevant movement section, the first and second desired values $x_{c,soll}$ and $x_{f,soll}$ determined for the relevant movement section are released, are transmitted to a first buffer 32 and are stored in the first buffer 32 (see FIG. 3) for further processing. As illustrated in FIG. 3, the first desired values $x_{c,soll}$ and the second desired values $x_{f,soll}$ are then output from the buffer 32 to the respectively associated drive shaft 20a and 20b, that is to say more precisely to the regulating means 16a and the regulating means 16b within the scope of the exemplary embodiment, equidistantly in terms of time and are transmitted to the regulating means 16a and 16b. Within the scope of the exemplary embodiment, a first desired value and a second desired value are output from the first buffer 32 every millisecond, for example, and are transmitted to the regulating means 16a and 16b.

If the first desired values $x_{c,soll}$ of the relevant movement section do not comply with the movement restrictions $V_c$, $A_c$ and $J_c$ and/or the second desired values $x_{f,soll}$ of the relevant movement section do not comply with the predefined movement restrictions $V_f$, $A_f$ and $J_f$, changed desired movement values for the relevant movement section are generated by the desired value generating unit 15' in an iterative process until the first and second desired values $x_{c,soll}$ and $x_{f,soll}$ comply with the predefined movement restrictions.

If an individual movement restriction or a plurality of the movement restrictions $V_c$, $A_c$, $J_c$, $V_f$, $A_f$ and $J_f$ is/are not complied with, that is to say is/are exceeded, the first and second desired values $x_{c,soll}$ and $x_{f,soll}$ of the relevant movement section are not released by the monitoring unit 31 and are not transmitted to the first buffer 32 and an item of restriction exceeding information R is transmitted to the desired value generating unit 15', which information states that an individual movement restriction or a plurality of movement restrictions has/have been exceeded and which of the movement restrictions $V_c$, $A_c$, $J_c$, $V_f$, $A_f$ and $J_f$ have been exceeded.

In accordance with the restriction monitoring information R, the control restrictions $V_x$, $A_x$ and/or $J_x$ which are predefined for the desired value generating unit 15' and apply to the overall movement of the machine element 8 in the X direction are reduced, that is to say their values are reduced. The desired value generating unit 15' then generates changed desired movement values $x_{soll}$ for the overall movement of the machine element 8 in the X direction taking into account the reduced control restrictions $V_x$, $A_x$ and/or $J_x$ which now apply to the overall movement. If the monitoring unit 31, for example, has determined that the first desired values $x_{c,soll}$ do not comply with the movement restriction $V_c$ (speed) in the relevant movement section, a corresponding item of restriction monitoring information R which states that the movement restriction $V_c$ has not been complied with is transmitted to the desired value generating unit 15', whereupon the speed control restriction $V_x$ applying to the overall movement of the machine element in the X direction is reduced in the desired value generating unit 15' and accordingly changed desired movement values $x_{soll}$ are determined taking into account the reduced speed control restriction $V_x$ and are transmitted to the movement dividing unit 23.

Within the scope of the exemplary embodiment, the speed control restriction $V_x$ is reduced in this case by a factor of 0.75, for example, that is to say $V_x := 0.75 \cdot V_x$. If the first desired values $x_{c,soll}$ determined from the changed desired movement values still do not comply with the movement restrictions $V_c$, an item of restriction exceeding information R is again transmitted to the desired value generating unit 15', whereupon the latter again further reduces the speed control restriction $V_x$ which has already been reduced, that is to say reduces it further by a factor of 0.75 within the scope of the exemplary embodiment, and again generates changed desired movement values $x_{soll}$ for the relevant movement section on the basis of the speed control restriction which has been reduced further. This iterative process is repeated until the first and second desired values and $x_{c,soll}$ and $x_{f,soll}$ comply with all movement restrictions $V_c$, $A_c$, $J_c$, $V_f$, $A_f$ and $J_f$ and the first and second desired values $x_{c,soll}$ and $x_{f,soll}$ determined for the relevant movement section are consequently transmitted from the monitoring unit 31 to the first buffer 32 and are stored there.

The starting values for the control restrictions $V_x$, $A_x$ and $J_x$ are predefined in this case the first time the machine is started up, for example.

Within the scope of an advantageous embodiment of the invention, the control device 14' may have a second buffer 30, as illustrated using dashed lines in FIG. 3. The desired movement values $x_{soll}$ generated by the desired value generating unit 15' are stored in the second buffer 30 and are read from the second buffer 30 by the movement dividing unit 23. The second buffer 30 makes it possible for the desired value generating unit 15' to operate independently of the movement dividing unit 23 in terms of time. Depending on the amount of computation time available, desired movement values $x_{soll}$ are generated by the desired value generating unit 15' and are stored in the second buffer 30. In a corresponding manner, the movement dividing unit 23 reads the desired movement values $x_{soll}$ from the second buffer 30 as required.

The first and second desired values $x_{c,soll}$ and $x_{f,soll}$ are temporally determined in advance before the machine element 8 is actually moved and are stored in the first buffer 32 until the precalculated movement section is actually carried out. In the exemplary embodiment, the first buffer 32 also makes it possible for only the first buffer 32 to have to operate in real time, rather than the desired value generating unit 15', the second buffer 30, the movement dividing unit 23 and the monitoring unit 31. However, other embodiments of the invention in which the first buffer 32 does not have to operate in real time are also possible.

Within the scope of the exemplary embodiment, the machine tool 36 has redundant kinematics only in the X direction. However, it goes without saying that a machine can generally also additionally have redundant kinematics with respect to other directions of movement (for example Y direction, Z direction), the invention also naturally being able to be used with these kinematics.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for moving a machine element of an automation machine, comprising the steps of:
    dividing an overall movement of the machine element into movement sections having a first movement component and a second movement component extending in a common direction,
    generating desired movement values for controlling the overall movement, said desired movement values being composed of first desired values for controlling the first movement component and second desired values for controlling the second movement component,
    simultaneously monitoring the first and second desired values for compliance with at least one predefined movement constraint selected from the group consisting of $V_c$ (speed of first movement component), $A_c$ (acceleration of first movement component), $J_c$ (jerk of first movement component), $V_f$ (maximum speed of second movement component), $A_f$ (maximum acceleration of second movement component) and $J_f$ (maximum jerk of second movement component),
    when at least one value of the first and second desired values fails to comply with the at least one predefined movement constraint, generating restriction monitoring information and changing the overall movement of the machine element based on the restriction monitoring information in an iterative process until new changed first and second desired values derived from the changed overall movement are in compliance with the at least one predefined movement constraint, and
    moving the machine element by using the complying changed first and second desired values in accordance with the at least one predefined movement constraint.

2. The method of claim 1, further comprising the steps of:
    storing the desired movement values in a second buffer and reading the stored desired movement values from the second buffer with a movement dividing unit, and
    with the movement dividing unit determining from the read desired movement values the first desired values and the second desired values.

3. The method of claim 1, wherein the automation machine is embodied as a machine tool.

4. The method of claim 1, further comprising the steps of:
    storing the complying changed first and second desired values as new first and second desired values, and
    moving the machine element by using the new first and second desired values in accordance with the predefined movement constraint.

5. A control device for controlling an overall movement of drive shafts of a machine element of an automation machine, with the overall movement of the machine element being divided into movement sections having a first movement component and a second movement component extending in a common direction, the control device comprising:
    a setpoint generator which generates, for the movement sections, desired overall movement values controlling the overall movement in the common direction,
    a movement apportioning device which receives from the setpoint generator the desired overall movement values, and determines from the generated desired overall movement values first desired values for controlling the first movement component and second desired values for controlling the second movement component, and
    a comparator which receives from the movement apportioning device the first and second desired values, and simultaneously monitors to check whether the first and second desired values comply with at least one predefined movement constraint selected from the group consisting of $V_c$ (speed of first movement component), $A_c$ (acceleration of first movement component), $J_c$ (jerk of first movement component), $V_f$ (maximum speed of second movement component), $A_f$ (maximum acceleration of second movement component) and $J_f$ (maximum jerk of second movement component),
    wherein the comparator is configured to transmit, when at least one value of the first and second desired values fails to comply with the at least one predefined movement constraint, restriction exceeding information to the etpoint generator, which then changes the overall movement of the machine element based on the restriction monitoring information in an iterative process until new changed first and second desired values derived from the changed overall movement are in compliance with the at least one predefined movement constraint, and to thereafter transmit the complying changed first and second desired values to the drive shafts for controlling the overall movement of the machine element.

6. The control device of claim 5, wherein the automation machine is embodied as a machine tool.

7. The control device of claim 5, further comprising a first buffer which stores the complying changed first and second desired values as new first and second desired values and transmits the complying changed first and second desired values to the drive shafts equidistant in time.

* * * * *